United States Patent [19]

Maida

[11] Patent Number: 4,462,670

[45] Date of Patent: Jul. 31, 1984

[54] LIGHT MEASURING APPARATUS FOR CAMERA

[75] Inventor: Osamu Maida, Tokyo, Japan

[73] Assignee: Nippon Kogaku K.K., Tokyo, Japan

[21] Appl. No.: 417,170

[22] Filed: Sep. 13, 1982

[30] Foreign Application Priority Data

Sep. 18, 1981 [JP] Japan .............................. 56-146080
Sep. 18, 1981 [JP] Japan .............................. 56-146081
Sep. 18, 1981 [JP] Japan .............................. 56-146082

[51] Int. Cl.³ ........................................... G03B 7/081
[52] U.S. Cl. ................................. 354/425; 354/432
[58] Field of Search .................. 354/24, 31, 425, 432

[56] References Cited

U.S. PATENT DOCUMENTS 4,045,142 8/1977 Watanabe .................... 354/24 X

Primary Examiner—Michael L. Gellner
Attorney, Agent, or Firm—Shapiro and Shapiro

[57] ABSTRACT

A light measuring apparatus for camera is disclosed. It is known that some type of light measuring apparatus for camera involves the problem of so-called "latch" which is caused by opposite charge accumulated at the high impedance location in the light measuring circuit. The light measuring apparatus is provided with means for cancelling the latch in a simple and reliable manner.

21 Claims, 13 Drawing Figures

LIGHT MEASURING APPARATUS FOR CAMERA

BACKGROUND OF THE INVENTION

1. Field of the Invention

The present invention relates to a light measuring apparatus for camera.

2. Description of the Prior Art

In the art there is known and used such type of light measuring circuit comprising a light receptor photo diode, a high input impedance operational amplifier and a logarithmic conversion diode. In this type of the circuit, the two ends of the photo diode is imaginarily short-circuited. The photo current generated in the photo diode flows into the logarithmic conversion diode which converts the input photo current into a logarithmically compressed voltage. The voltage is used as a photometric value for exposure control.

The above mentioned type of light measuring apparatus has the advantage that the responsiveness of the output voltage to the change of light intensity is higher than other conventional system wherein such open voltage is used for exposure control which is generated at the both ends of a photo diode and logarithmically converted according to the intensity of light.

However, the known light measuring apparatus has some difficult problems.

When the supply voltage is applied to the light measuring circuit, there is generated noise in the circuit. Relative to the rise time of the supply voltage, a longer time is required before the operational amplifier gets in a stabilized state. Because of the generated noise and the unstable period of the operational amplifier, some amount of opposite charge is accumulated at the connection point of photo diode and logarithmic conversion diode where the input impedance is extremely high. This accumulation of opposite charge causes the problem of so-called "latch". The latched state remains not lost for a long time. This makes it impossible to obtain a normal measuring voltage from the circuit in a short time after the application of power source to the circuit. In fact, hitherto, it has been required a long time to obtain the normal output voltage from the light measuring circuit.

To solve the problem of latch it has been proposed to provisionally short-circuit the two ends of the photo diode by use of a transistor only during the time of the operational amplifier being unstable. However, according to the solution, there occurs abrupt change of potential at the switching of the transistor. The potential change is transmitted to the connection point through stray capacity as noise which causes latch again. It has been found that the solution is not effective for cancelling the latch and sometimes it is rather harmful for the latch cancellation.

As another solution to the problem of latch it is also known to use a light emitting element such as LED in the circuit to generate a neutralizing current by it only during the unstable period of the operational amplifier thereby cancelling the latch by the generated current. However, this solution has some drawbacks. It needs voluminous and expensive circuit. Further, the power consumption increases up.

The above mentioned problem of latch occurs also in flash light photographing employing TTL flash output control.

To electrically control the high speed shutter of camera there is generally used OFF-type magnet. OFF-type magnet is such type of magnet which is holding the closing blade of shutter during the application of current to the magnet coil and releases the holding of the closing shutter blade when the supply current to the coil is cut off. With this type of magnet it is possible to control a high speed shutter in a stable manner. However, when the supply current to the coil is rapidly cut off, a considerable amount of kick-back noise is produced by inverse induced voltage. In flash light photographing, the operation of shutter is carried out after stopping the flash light emission by the flash output control. This means that the kick-back noise is generated in the dark. In case of a camera for which a high density mounting is required, it is very difficult to prevent TTL metering circuit from being affected by the kick-back noise. In practice, it may be impossible. The light measuring circuit for TTL flash output control is necessarily latched whenever it is affected by such kick-back noise in the dark. When the next shooting with flash light is carried out immediately after one shooting, it is impossible to calculate the correct and proper exposure value for the next shooting unless the latch caused by the kick-back noise generated at the previous shooting is cancelled before the next shooting. The reason for this is that the output of the measuring circuit can not become normal unless the charge which has caused the latch is neutralized. So long as the output is in the abnormal state, any correct value of measured light can not be obtained. In the dark, the current available for the neutralization is substantially zero. Therefore, if two or more flash light exposures are carried out in succession, a large portion of the photo current will be consumed as the neutralizing current to cancel the previously caused latch. As the photo current is partly consumed as the neutralization current, the flash output control is rendered unstable and unreliable. The photo current consumed for the latch cancellation has an important effect on the correctness of measurement in particular when a film of high photosensitivity is used. The higher the photosensitivity of film is, the higher ability is required for the light measuring circuit to measure the light under the condition of less photo current. The error in measurement caused by the photo current consumed for the above neutralization, therefore, increases with increasing the film sensitivity. Consequently, the film which can practically be used is limited to the low sensitivity film only. This means that the range of film sensitivity usable is narrowed, which brings forth a serious problem.

SUMMARY OF THE INVENTION

Accordingly, it is an object of the invention to solve the problem of the accumulation of charge in the photo diode in the above-mentioned type of light measuring circuit attributable to the transient unstable state of the operational amplifier.

More particularly, the object of the invention is to provide a light measuring apparatus which overcomes the above problem effectively and with a simple circuit.

Other and further objects, features and advantages of the invention will appear more fully from the following description taken in connection with the accompanying drawings.

DETAILED DESCRIPTION OF THE PREFERRED EMBODIMENTS

Figure 1:
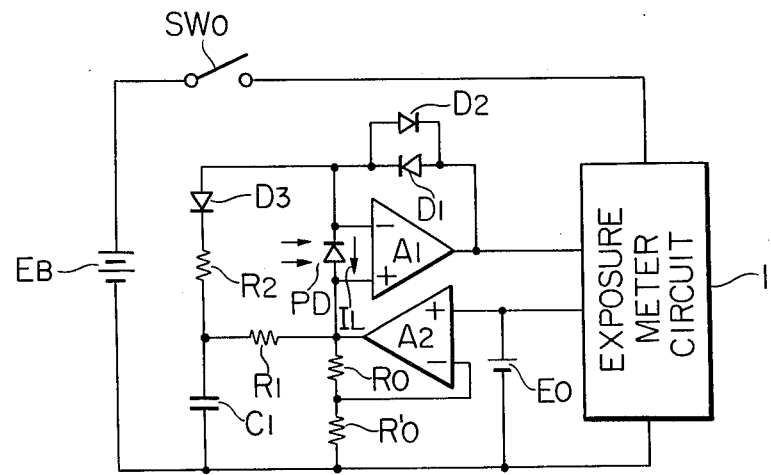
FIG. 1 is a circuit diagram showing a first embodiment of the invention.

Referring first to FIG. 1 showing a first embodiment of the light measuring apparatus according to the invention, $E_B$ is a power supply source, SWo is a power source switch and A1 and A2 are operational amplifiers. 1 is an exposure meter circuit. By turn-ON of the power source switch SWo, an electric power is supplied to the operational amplifiers A1 and A2, and to the exposure meter circuit 1 from the supply source $E_B$. A photo diode PD is connected between two input terminals of the amplifier A1. The photo diode PD has photo current $I_L$ generated in the direction of arrow according to the illuminance on the photo diode surface. The operational amplifier A1 is formed as a high input impedance operational amplifier. A logarithmic conversion diode D1 is connected between the negative input terminal and the output terminal of the operational amplifier A1 for logarithmic conversion of the photo current $I_L$. The photo current appears at the output terminal of the operational amplifier A1 as a logarithmically converted voltage with low impedance. The voltage is applied to the exposure meter circuit 1. Eo is a reference bias voltage source connected between the positive input terminal of the operational amplifier A2 and the negative line of the power source. The reference voltage from the bias voltage source Eo is in-phase amplified by the operational amplifier A2. The amplified reference voltage serves to set the reference potential for the output of the operational amplifier A1. The voltage from the reference bias voltage source Eo is also applied to the exposure meter circuit 1 as a reference bias voltage for the necessary operational processings in the circuit 1. The level of the reference bias voltage is determined by resistors Ro and Ro' connected at the output side of the operational amplifier A2. The potential at the connection point between the positive input terminal of A1 and the anode of PD is set higher toward the positive side than the voltage on the negative line of the power source $E_B$. The reason for this is that the higher potential is required for the operational processing in the exposure meter circuit 1 on one hand and that it is intended to carry out the latch cancellation to some degree by a diode D2 connected parallel to the logarithmic conversion diode D1 on the other hand.

The serial circuit containing diode D3, resistors R1 and R2 is connected parallel to the photo diode PD. A condenser C1 is connected between the connection point of the two resistors R1, R2 and the negative line of the supply source.

Through resistors Ro and Ro' connected between the output of A2 and the negative line of $E_B$, the condenser C1 is discharged during the power source switch SWo being open so that the condenser C1 has no charge thereon when the switch SWo is closed.

The operational amplifier A1 can not instantly set in the state of normal operation when the power source switch SWo is closed. It has necessarily some finite unstable time as a transition period to the stable operation state. During this unstable period, it is impossible to imaginarily short-circuit the photo diode PD. Consequently, the output of the operational amplifier A1 is being unstable during the period and the output becomes transitionally higher than the normal output thereof. This produces a flow of current into the photo diode PD through the logarithmic conversion diode D1. Thereby, charge is stored in the junction capacitance of PD and positive charges are accumulated on the cathode side of PD. Such a storage of charge is also formed by the chattering noise of the source switch SWo through the stray capacity of the circuit.

At the end of the above unstable period, the operational amplifier A1 intends to control the photo diode PD by imaginary short-circuit. However, when the illuminance on the light reception surface of PD is sufficiently high, the accumulated charge is neutralized at once by the photo current $I_L$. Therefore, in this case, the normal output is obtained instantly at the output terminal of the operational amplifier A1. When the illuminance becomes extremely low, the photo current then produced is very small which is in the order of several 10 PA to several PA. In this state, it takes a long time to restore the output to the normal level by the neutralization of the photo current $I_L$ only. In this case, the diode D2 serves to accelerate the return to the normal state up to a certain point. More particularly, with the accumulation of positive charge on the cathode side of the photo diode PD, the potential on the negative input side of A1 becomes more positive than the positive input side. Therefore, the output of the amplifier A1 drops down toward the negative line side of the power source and the diode D2 is biased in the forward direction. Consequently, the accumulated charge is discharged. In case that the power source for operating the operational amplifier A1 is of single system as in the case of the embodiment shown in FIG. 1, the minimum potential of A1 output never drops down under the voltage of the negative line of the power source. To discharge the accumulated charge, at least the diode D2 should be sufficiently biased in the forward direction when the potential of A1 output becomes substantially equal to the voltage of the negative line. To this end, a potential more positive than that on the negative line of the power source is given to the positive input of A1 by the operational amplifier A2. In this manner, the accumulated charge is discharged by the diode D2. After the charge is neutralized by the diode D2 to a certain degree, the output of the operational amplifier A1 gradually rises up. Since the diode D2 has a logarithmic characteristic, the forward voltage is reduced and equivalently it has a very high resistance. In this state of very high resistance, no further neutralization can be expected. A long time of from several 100 m sec. to several sec. will be required to complete the neutralization and restore the output to its normal state. However, in the shown embodiment, as amplifier A2 operates after power switch SWo is turned to ON state, the charge current to the condenser C1 flows in the direction to draw out the positive charge on the cathode side of the photo diode PD through diode D3, resistor R2 and diode D1. Because of this current, the voltage on the input side of the operational amplifier A1 changes and therefore its output voltage also changes. Since the condenser C1 is being charged through resistors R2 and R1, the voltage of the condenser C1 continues to rise up at the time. With the rise-up of the charged voltage on the condenser C1, the current flowing through the diode D3 smoothly decreases down. When the rising charge voltage on the condenser C1 reaches the level about 0.2 V lower than the output voltage of the amplifier A2, the forward applied voltage to the diode D3 becomes insufficient to act as the forward bias and therefore the equivalent resistance abruptly changes very high. In contrast, the resistance value of the resistor R1 remains unchanged and therefore the resistance of R1 becomes smaller relative to the abruptly raised resistance of the diode D3. Consequently, at this stage, the condenser C1 is charged predominantly by the resistor R1 and the operational state of the amplifier A1 is stabilized when the voltage on the condenser C1 becomes equal to the potential of the output of the amplifier A2.

After the voltage of the condenser C1 has reached the same potential as the output voltage of the operational amplifier A2, the operational amplifier A1 continues to operate normally. Therefore, there is produced an imaginary short-circuited state between the positive input and the negative input of the operational amplifier A1 and the potential difference appearing therebetween remains in the range less than several mv of the offset voltage of A1. In this range, the same voltage is applied also to the both ends of the diode D3. However, the current flowing at the time is very small as compared to the photo current $I_L$ so that it can be regarded as practically zero. Therefore, the effect of diode D3 on the light measurement is negligibly small even when the photo current is in the order of several PA. By suitably selecting the condenser C1, resistors R1 and R3 there can be obtained a value for obtaining the normal operation state in the shortest time. In the above embodiment, the resistor R2 has been provided to prevent overcurrent. Without the resistor there may be attained the same effect as above. In this case, the diode D2 also may be omitted. In the circuit shown above, the diode D3 for discharging the photo diode PD is biased by the difference between the charge voltage on the condenser C1 and the reference voltage which is the output of the operational amplifier A2. The diode D3 is independent of the output potential of the operational amplifier A1, that is, the discharge state of the photo diode PD. This assures that the unnecessary accumulated charge can be removed from the photo diode PD without fail in the first embodiment.

Figure 2:
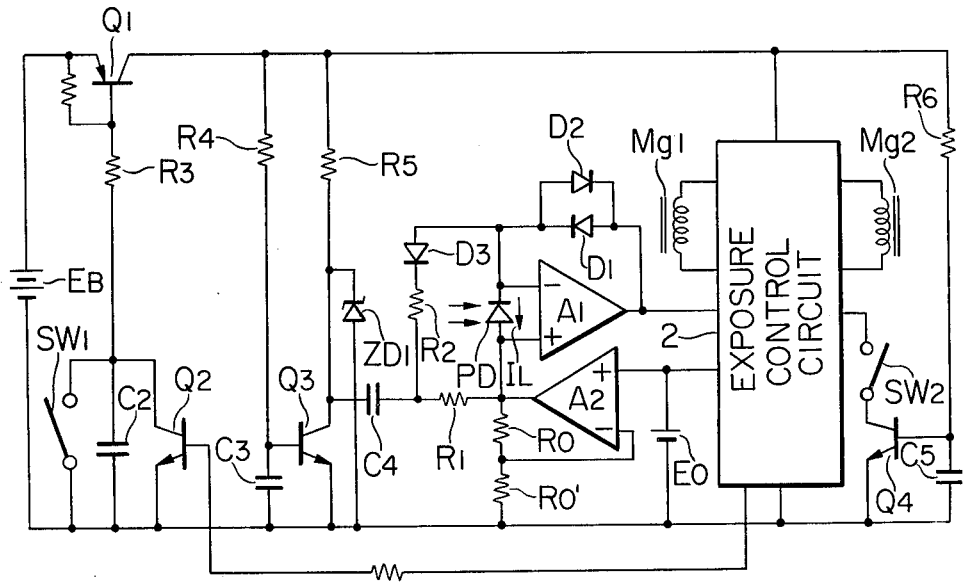
FIG. 2 is a circuit diagram showing a second embodiment.

FIG. 2 shows a second embodiment of the invention wherein the present invention is applied to an electronic shutter camera. In FIG. 2, like reference characters to FIG. 1 represent the same or corresponding elements of the circuit.

When the power source switch SW1 is turned ON, a condenser C2 connected parallel to the switch SW1 is short-circuited and also a transistor Q1 is rendered conductive. The condenser C2 is provided for power supply timer. The transistor Q1 is inserted into the positive line of the power source through a resistor R3. Thus, by turn-ON of the switch SW1, the circuit of this embodiment is powered. A certain time long after turn-OFF of the switch SW1, the transistor Q1 continues to be conductive owing to the charged current on the condenser C2. Generally, the switch SW1 is interlocked with the shutter release button of camera and is closed before the shutter button has moved over its one stroke for releasing.

Several 10 $\mu$sec. to several 100 $\mu$sec. after the conduction of the transistor Q1, the operational amplifiers A1 and A2 get in their normal operation state. A resistor R5 and a Zener diode ZD1 are connected in series between the positive line and the negative line of the power supply. According to the difference between the voltage at the joint of R5 and ZD1 and the output voltage of A2, a condenser C4 is charged positively on the side of resistor R5 and negatively on the side of R1. At this stage of operation, the voltage of condenser C3 charged through R4 is still low and a transistor Q3 remains non-conductive. Several m sec. after that, the charge voltage on the condenser C3 reaches a sufficient level enough to render the transistor D3 conductive. Thereby, the connection point of condenser C4 on the side of R5 is clamped down to the potential of the negative line of the power supply $E_B$. Therefore, at this moment, the potential at the other connection point of the condenser C4 drops down toward the negative side much more than the potential on the negative line side. By this negative voltage, the diode D3 is forward biased through resistor R2 in the same manner as in the above embodiment. Thus, the positive charge accumulated on the cathode side of the photo diode PD during the unstable period of the operational amplifier A1 is completely and surely discharged. Thereafter, in the same manner as in the above embodiment, the potential of condenser C4 smoothly changes until the potential of the condenser C4 on the connection side of R1, R2 becomes equal to the potential of the output of the operational amplifier A2. In this manner, the operational amplifier A1 can produce at once an output corresponding to the photo current $I_L$.

SW2 is a release switch which is closed at the end of one stroke of the camera shutter releasing button. Even if the shutter releasing button is pushed down hastily so that the two switches SW1 and SW2 are closed nearly at the same time, the turn-ON of the switch SW2 is transmitted to the exposure control circuit 2 only after a certain time determined by resistor R6 and condenser C5 has passed. The reason for this is that owing to the condenser C5 the transistor Q4 continues to be non-conductive for a time immediately after the transistor Q1 is rendered conductive to apply the source voltage to the circuit. The transistor Q4 is rendered conductive only after the determined time by resistor R6 and condenser C5, that is, after the latching of the operational amplifier A1 has been cancelled. On the conduction of transistor Q4, the turn-ON of the switch SW2 is transmitted to the exposure control circuit 2 to supply current to the electro-magnetic release magnet Mg1. With the current supply to Mg1, the exposure control sequence including the known mechanical operations of camera is started. Thus, the shutter control magnet Mg2 starts operating to control the shutter. The transistor Q2 is controlled by the control circuit 2 in such manner that it continues to be conductive during the time of from camera releasing to the end of exposure operation with the closing of the shutter. Therefore, even when the switch SW1 is opened during exposure, the transistor Q1 remains conductive to prevent the shutter from being closed during the exposure.

The difference between the first and second embodiments is as follows:

In the embodiment shown in FIG. 1, at the first stage of power supply, the diode D3 is forward biased by the output voltage of the operational amplifier A2. Therefore, the output voltage of A2 is required to be higher than the forward voltage of D3. In contrast, according to the embodiment shown in FIG. 2, the potential at the connection point of condenser C4 and resistor R2 drops more negatively than the negative line of the power source. Therefore, the diode D3 can be forward biased even when the output voltage of A2 is lower than the forward voltage of D3. In other words, the diode D3 can be forward biased to instantly release the operational amplifier A1 from the latched state even when the output voltage of A2 is zero, that is, even when the connection point of the positive input side of A1, the anode of PD and R1 is grounded.

In the above embodiment, the function of Zener diode ZD1 is to keep the charge voltage constant at the first stage of power supply even when there occurred any variation in the source voltage.

Figure 3:
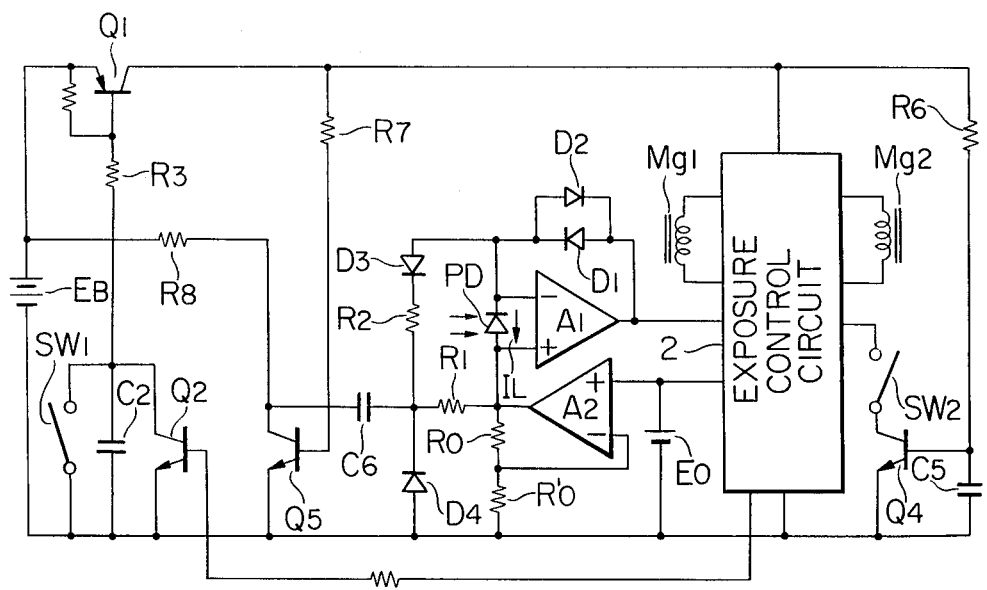
FIG. 3 is a circuit diagram showing a third embodiment.

FIG. 3 shows a third embodiment of the invention. In FIG. 3, like reference characters to FIG. 2 represent the same or corresponding elements.

In the above second embodiment, the condenser C4 is once charged at the first step of power supply without biasing the diode D3. The diode D3 is biased after a certain determined time by resistor R4 and condenser C3. In contrast, the diode D3 in the third embodiment is forward biased during the time of the transistor Q1 being conductive. To this end, a condenser C6 is provided which is precharged through registors R8, R1 and resistors Ro and Ro' connected between the output of the operational amplifier A2 and the negative line of the power supply.

When the switch SW1 is closed and the transistor Q1 is rendered conductive, the transistor Q5 is rendered conductive in synchronism it by a bias voltage through a resistor R7. At the time, the potential at the terminal of R8 of the condenser C6 becomes equal to the potential on the negative supply line. The potential at the connection point of the condenser C6 and resistors R1, R2 drops further toward the negative side than the negative supply line. Thereby, the diode D3 is forward biased to perform the same operations as described above. To keep the degree of the forward bias of the diode D3 constant irrespective of possible variation in voltage of the power source $E_B$ there is provided a diode D4. When the potential of the condenser C6 on the side of connection point of R1 and R2 becomes a more negative value than the negative supply line, the level of the negative potential is clamped by the diode D4 at a certain definite value which is the forward voltage of the diode D4. Therefore, a constant forward bias is applied to the diode D3 irrespective of the possible variation in voltage of the power source. Other operations of the third embodiment correspond to those of the second embodiment and therefore need not be further described.

Figure 4:
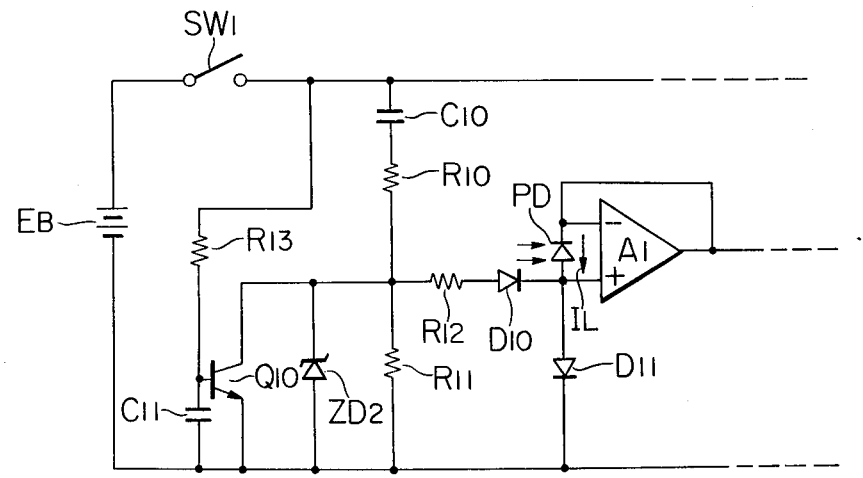
FIG. 4 is a circuit diagram showing a fourth embodiment.

FIG. 4 shows a fourth embodiment of the invention.

The fourth embodiment is different from the above first to third embodiments in the manner of logarithmic compression of the photo current. In the first to third embodiments, the logarithmic conversion diode D1 has been connected the negative input and the output of the operational amplifier A1. In contrast, in the fourth embodiment, a logarithmic conversion diode D11 is connected between the positive input of the operational amplifier A1 and the negative line of the power source. In this case, negative charges are accumulated on the anode side of the photo diode PD during the abovementioned unstable period of the operational amplifier A1 at the beginning of power supply thereby causing latching. Since there is no charge on condenser C10 for some time long immediately after the start of power application, when the switch SW1 is closed, a voltage determined Zener diode ZD2 is produced at the junction of resistors R10, R11, R12. The voltage is selected to be higher than the sum of the forward voltages of the diodes D10 and D11. Therefore, the diode D10 is forward biased and the negative charge on the anode side of D11 is neutralized by it. The condenser C10 is gradually charged with time and the potential at the junction of resistors R10, R11, R12 drops. Consequently, the forward current in the diode D10 decreases smoothly. On the completion of charging of C10, the potential at the junction of R10, R11, R12 becomes equal to the potential on the negative line of the power supply. At the time, the diode D10 is fully inverse-biased not to give any effect to the light measuring circuit.

As the photo current flows in the diode D11 in the forward direction, there is generated a logarithmically compressed voltage at the both ends of the diode D11. The voltage thus generated is transmitted to other circuits at a low impedance by the operational amplifier A1. A certain determined time after the turn-ON of switch, a transistor Q11 is rendered conductive. The time is determined by resistor R13 and condenser. In other words, the transistor Q10 is rendered conductive when the charging of condenser C11 has been substantially completed. With the conduction of the transistor Q10 the junction of R10, R11, R12 is short-circuited to minimize the change of potential at the junction of R10, R11, R12 during the operation of power supply even if there occurs any voltage change as caused, for example, by sudden change of load on the power source $E_B$ resulting from the control of current applied to the shutter control magnet Mg2.

Figure 5:
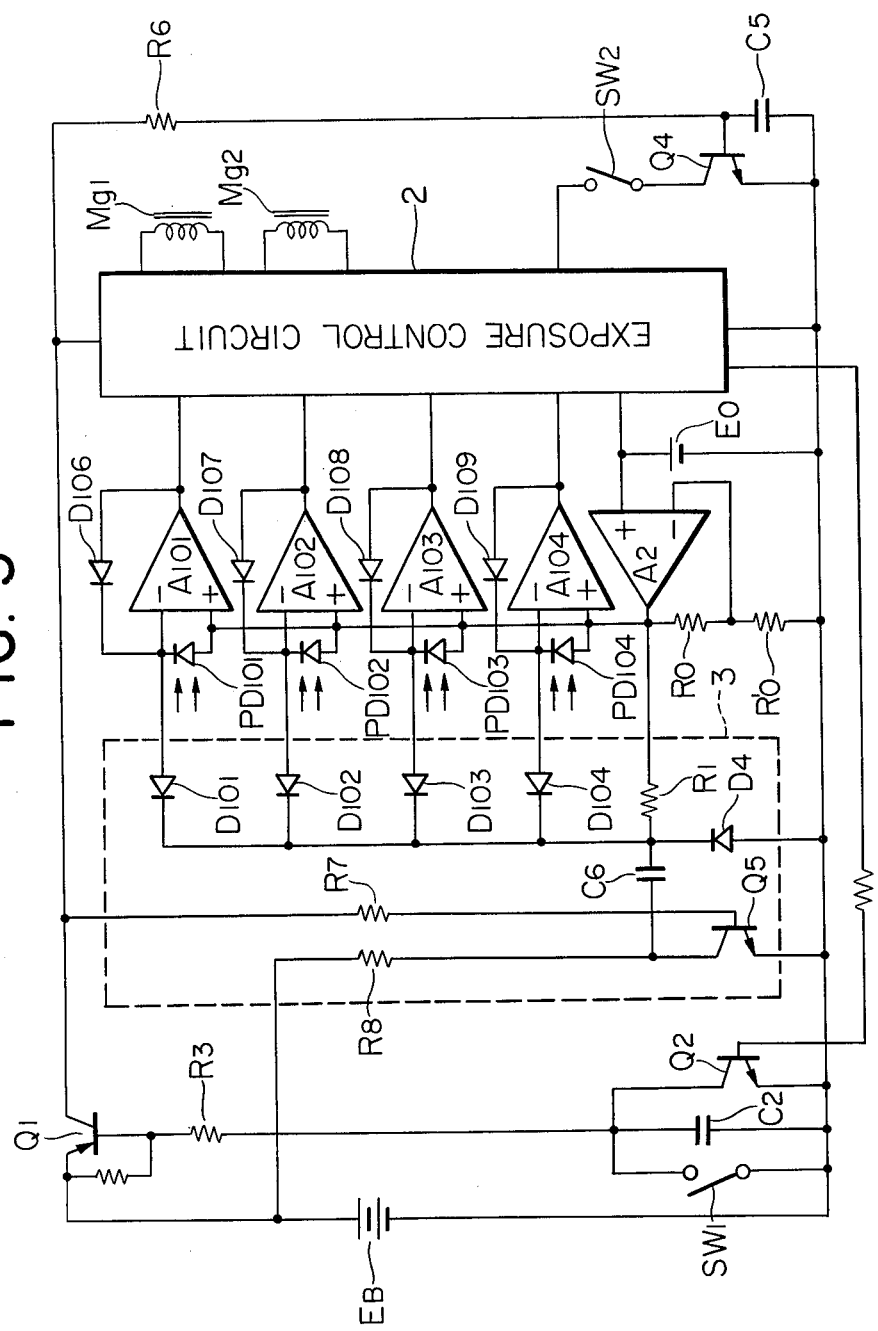
FIG. 5 is a circuit diagram showing a fifth embodiment.

FIG. 5 shows a fifth embodiment of the invention. In FIG. 5, like reference characters to FIGS. 1 to 4 represent the same or corresponding elements which need not be further described.

The fifth embodiment includes photo diodes PD101 to PD104 which are multi-metering photo sensor elements. Metering amplifiers comprising operational amplifiers A101 to A104 and logarithmic conversion diodes D106 to D109 are connected to the photo diodes PD101 to PD104 respectively.

Eo is a reference bias source which is in-phase amplified by an operational amplifier A2. The amplified reference bias source is used to set the reference potential of each the operational amplifier A101–A104. The reference bias source Eo is applied also to the exposure control circuit 2 as the reference voltage for operational processings by the control circuit. The exposure control circuit 2 is constituted of various known circuits such as a control circuit for computing proper exposure value from the photometric outputs of the operational amplifiers A101–A104 and controlling the exposure, a display circuit, a release circuit etc.

The part enclosed with a dotted line 3 in FIG. 5 indicates a latch cancelling circuit which includes transistor Q5, diodes D4, D101–D104, resistors R1, R7, R8 and condenser C6.

The manner of operation of this embodiment is as follows:

When the power source switch SW1 is in its opened position and the transistor Q1 is non-conductive state, that is, when no electric power is being applied to the metering circuit and the exposure control circuit 2, the condenser C6 is charged up to the same voltage level as $E_B$ in the manner described above. The charge to the condenser C6 is positive on the side connected to the collector of transistor Q5 and negative on the side connected to the cathode of diode D4.

When the switch SW1 is closed, the transistor Q1 is rendered conductive to start the power supply to the circuits. In synchronism with the conduction of Q1, a base current flows into the transistor Q5 through resistor R7 and therefore the transistor Q5 is rendered conductive so that the voltage at the connection point of the condenser C6 to the collector of Q5 becomes the same level as the negative line of the power supply $E_B$. The voltage of the condenser C6 at the connection point with the cathode of D4 is shifted to a negative voltage. The voltage difference between the negatively shifted voltage and the output of the operational amplifier A2 is preset to a higher value than the forward voltage of each discharging diode D101–D104. Therefore, at this stage of operation, all of the diodes D101 to D104 are forward biased and a current flows through the diodes D106 to D109. By the current the opposite charge is neutralized which has been accumulated at high impedance connection points of photo diodes PD101–PD104 and logarithmic conversion diodes D106–D109.

The condenser C6 is rapidly charged with the current flowing in through the diodes D101–D104 and the current flowing in through the resistor R1. The charging stops when the negative voltage on the side connected to the cathode of D4 reaches the same level as the positive voltage of the output of A2. At this time point, the forward bias to the discharging dioded D101–D104 is lost. Therefore, from the time point the discharging diodes D101–D104 have no substantial effect on the metering circuit. In practice, the logarithmic conversion output begins depending on the photo current only even before the voltage on the cathode side of the diode D4 becomes equal to the output voltage of the operational amplifier A2. It begins when the difference between the two voltages is reduced up to the range of 0.15 to 0.2 V. The reason for this is that when the respective bias voltages to diodes D101–D104 are reduced to the level of about 0.15–0.2 V, the current flowing through the diodes becomes very small as compared to the photo current.

After the above two voltages have become equal to each other, the voltage applied to the both ends of diodes D101–D104 is only the offset voltage of every amplifier (which voltage is in the order of only several mV). Therefore, after the latch cancellation the measured value of light is never affected by the diodes D101–D104.

After the lapse of a certain time during which the normal photometric voltage of the operational amplifiers A101–A104 can be transmitted to the control circuit 2 for controlling the proper automatic exposure, the transistor Q4 is rendered conductive to allow the turn-ON signal of the release switch SW2 to be transmitted to the cotrol circuit 2. In the embodiment shown in FIG. 5, it is possible to lower the cathode voltage of each diode D101–D104 toward the negative side beyond the negative voltage of the power source $E_B$ at the start of power supply. Therefore, the latch cancellation is possible even when the output of the operational amplifier A2 is set to 0 (zero) V, that is, even when the common connection point of the positive inputs of A101–A104 is grounded on the negative side of the power source $E_B$.

In the manner described above, the latch cancellation is performed by flowing a current into the diodes D101–D104. The requirement for obtaining the flow of current into the diodes is that at the first stage of power supply, the cathode voltage of the diodes D101–D104 should be set to negative relative to the output voltage of the operational amplifier A2, that is, relative to the voltage at the common connection point of the positive inputs of the operational amplifiers A101–A104.

According to the above embodiment, it is unnecessary to provide separate latch cancelling circuits for the individual metering circuits of the multi-metering circuit. In the above arrangement, each one of the discharging diodes D101–D104 is provided connected to each one of the respective metering circuits. However, as the bias point for provisionally applying the forward bias to their discharging condenser there exists only one point which is the connection point of condenser C6 and resistor R1. All of the discharging diodes are connected, at their one end, to the common bias point. Even with such an arrangement of circuit, the metering circuits never interfere each other. The discharging diodes between every two neighbouring metering circuits are serially connected in the opposite direction, which prevents interfere between two neighbouring metering circuits. In other words, every discharging diode performs two functions at the same time, one for discharging and the other for separating two neighbouring metering circuits from each other. In this manner, according to the invention, a simple and reliable latch cancellation circuit for multi-metering apparatus can be realized.

The arrangement of the latch cancelling circuit may be further simplified if the output voltage of the operational amplifier A5 is higher than the forward voltage generated when the current necessary for latch cancellation is flowed into the diodes D101–D104. Such a further simplified modification of the latch cancelling circuit will be shown in FIG. 6 as a sixth embodiment of the invention.

Figure 6:
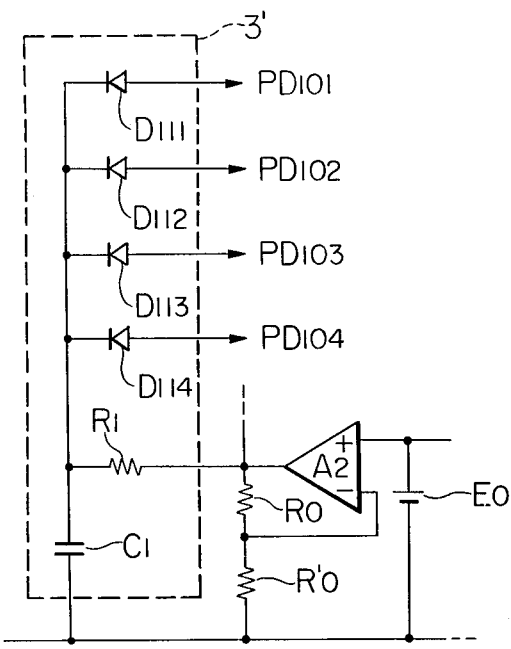
FIG. 6 is a circuit diagram showing a sixth embodiment.

In FIG. 6, the part enclosed with a dotted line 3' of the circuit corresponds to the part enclosed with the dotted line 3 previously shown in FIG. 5. The part indicated by 3' includes discharging diodes D111 to D114, condenser C1 and resistor R1. Other parts of the circuit of the sixth embodiment correspond to those shown in FIG. 5 and therefore they are omitted from FIG. 6.

The diodes D111, D112, D113 and D114 in FIG. 6 correspond to the diodes D101, D102, D103 and D104 respectively. The condenser C1 in FIG. 6 corresponds to the condenser C6 in FIG. 5. The manner of operation of this sixth embodiment is essentially the same as that of the first embodiment shown in FIG. 1 and therefore need not be further described.

Figure 7:
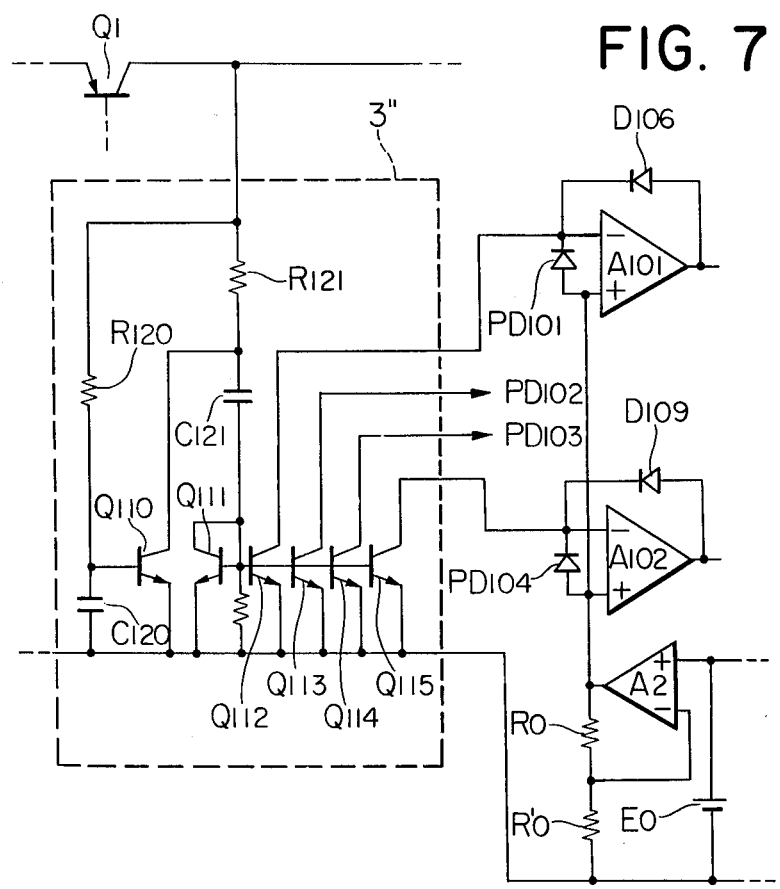
FIG. 7 is a circuit diagram showing a seventh embodiment.

FIG. 7 shows a seventh embodiment of the invention wherein the latch is cancelled by a current source formed by transistor.

In FIG. 7, the part enclosed with a dotted line 3" is a latch cancelling circuit which corresponds to the part enclosed with the dotted line 3 previously shown in FIG. 5. A transistor Q1 is inserted in the current supply line. When the transistor Q1 is rendered conductive, the current is allowed to flow into a current mirror circuit composed of transistors Q111–Q115 through resistor R121 and condenser C121. The charged current on the condenser is equal to the absorption current at each the collector of the current mirror transistors Q112–Q115. With charging of the condenser C121, the absorption current gradually decreases down. Finally, it is reduced to zero. This collector current of Q112–Q115 flows into diodes D106–D109 whereby the latch is cancelled.

Although the current flows also into a resistor R120 simultaneously with the conduction of the transistor Q1, the transistor Q110 remains non-conductive for a while after the conduction of Q1 owing to the condenser C120. The transistor Q110 is rendered conductive after a certain delay time determined by resistor R120 and condenser C120, that is, after the current of Q112–Q115 has decreased down to zero. With the conduction of the transistor Q110, the charge on the condenser C121 is discharged. During this discharging of C121, the collector current of Q112–Q115 remains zero. By rendering the transistor Q110 conductive, the connection point of resistor R121 and condenser C121 is clamped. This clamping prevents error in latch cancelling operation which may be caused by variation in voltage of the power source $E_B$. The source voltage may be changed, for example, when the current is applied to the magnet coil etc. for exposure control. If there occurs such change in source voltage, a flow of current into the condenser C121 is caused by it and the corresponding collector current flows in the transistors Q112–Q115. This may cause mal-function of the latch cancelling operation. Above clamping of the connection point of R121 and C121 prevents such error in latch cancelling operation. When the connection point is clamped, the base of transistor Q11–Q115 serves as the current input point.

Figure 8:
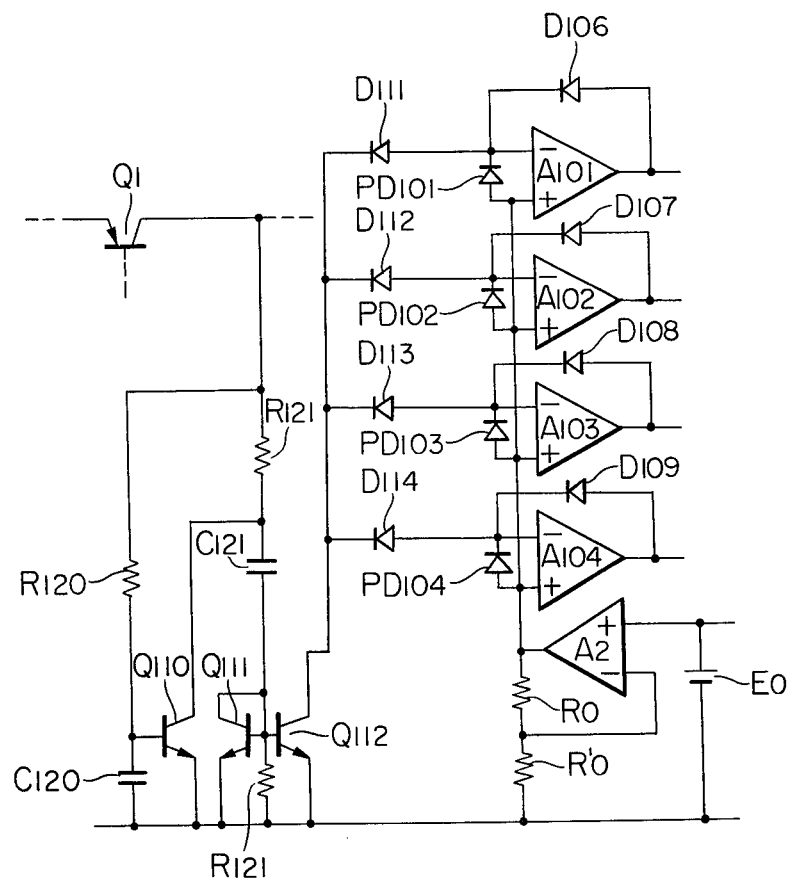
FIG. 8 is a circuit diagram showing a eighth embodiment.

FIG. 8 shows an eighth embodiment of the invention.

The eighth embodiment is different from the above seventh embodiment only in the point that there is provided only one output transistor (Q112) for the current mirror circuit and that through the associated diode D11–D114 a forced current is applied to every junction point within each the metering circuit (the connection point of the negative input terminal of the oprational amplifier, one electrode of the photo diode and one electrode of the logarithmic conversion diode). By employing this arrangement there can be obtained the same effect as that obtainable by the above embodiment.

In FIG. 8, like reference characters to FIG. 7 represent functionally the same elements as those in FIG. 7.

Figure 9A:
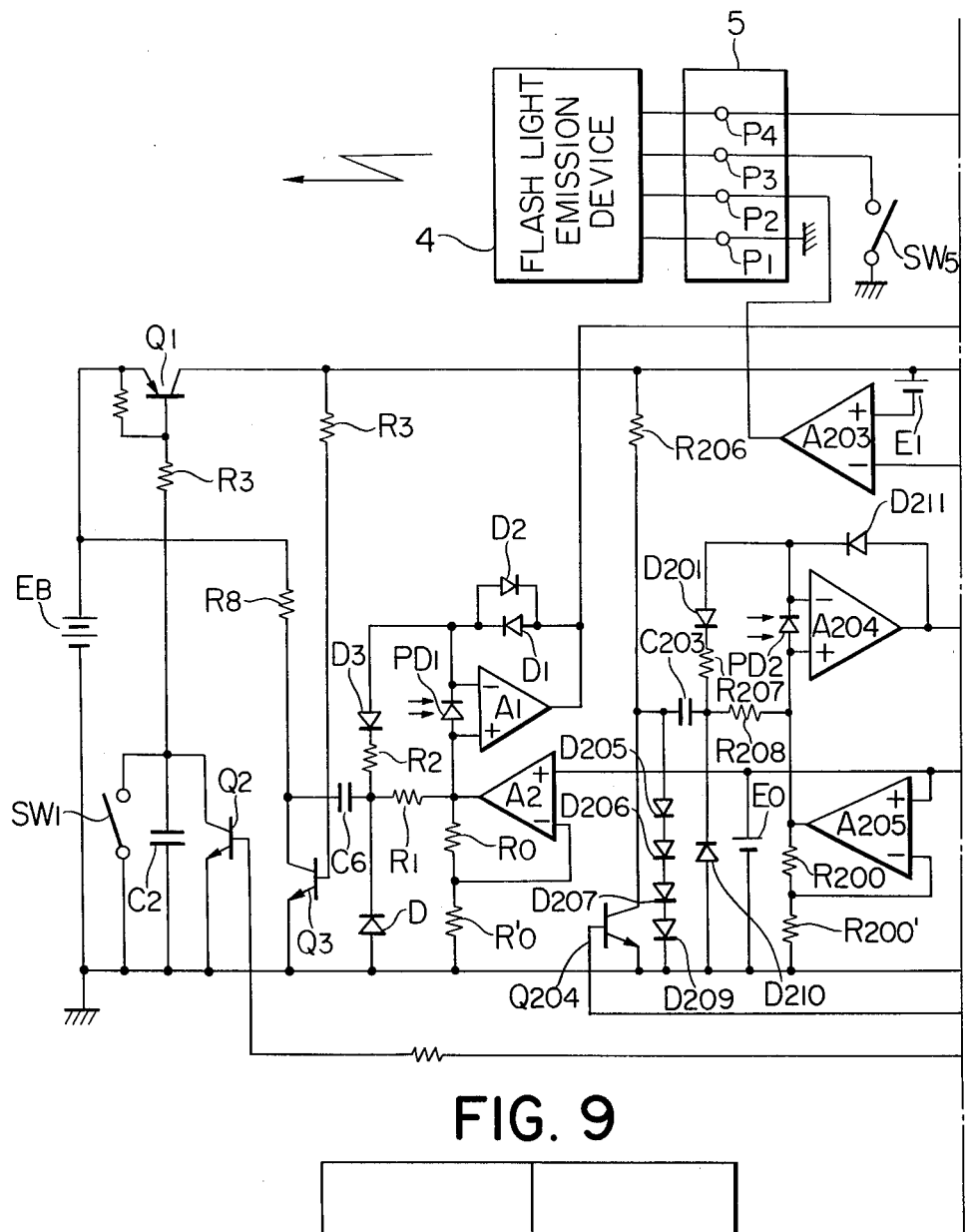
FIGS. 9, 9A and 9B is a circuit diagram showing a ninth embodiment.
Figure 9:
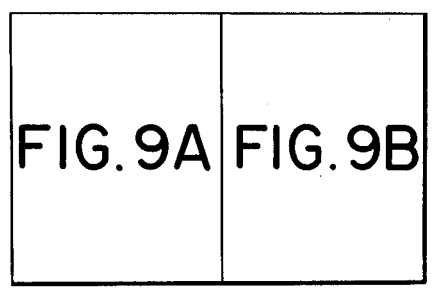
Figure 9B:
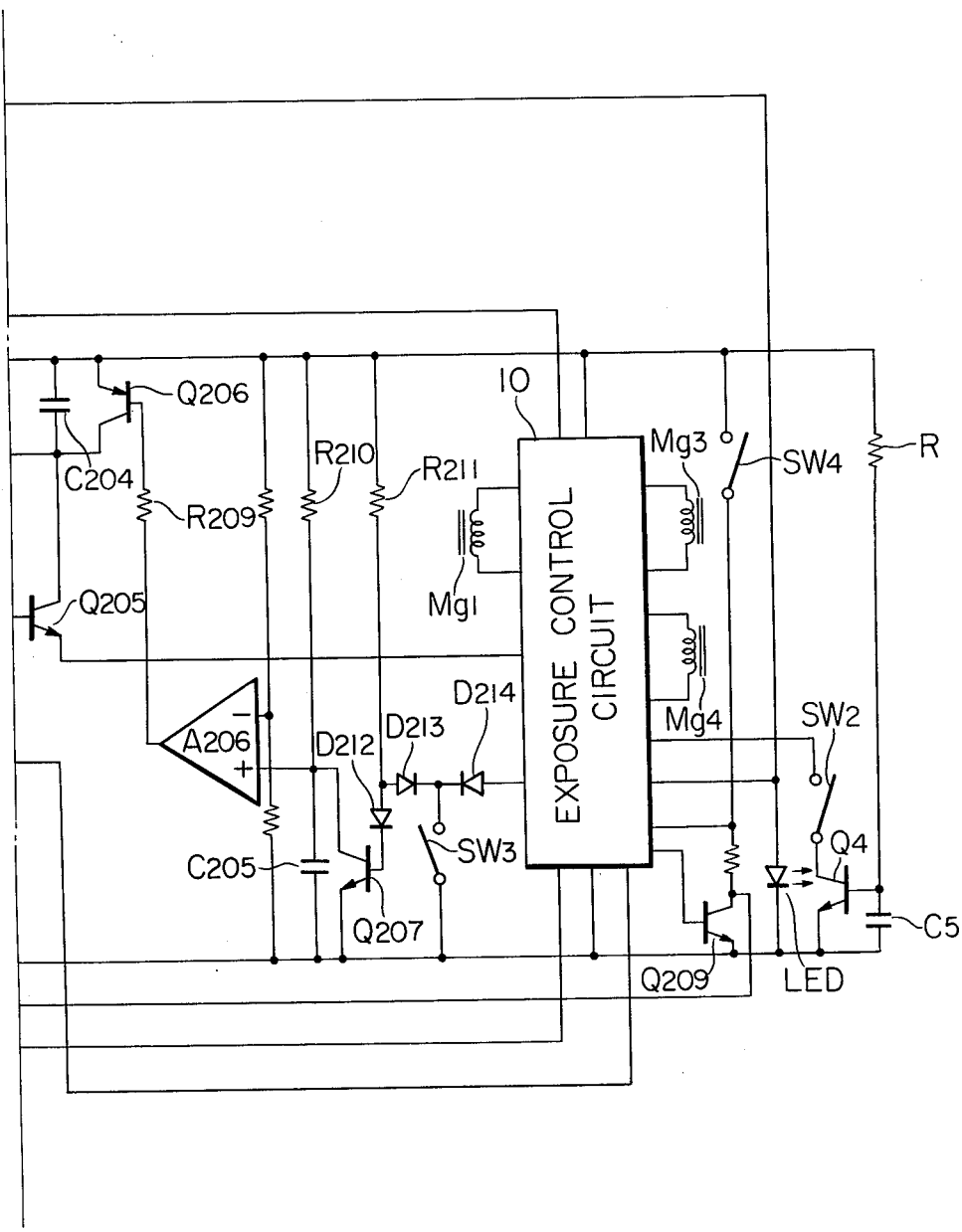

FIG. 9 shows a ninth embodiment of the invention wherein flash-light photographing according to the TTL light measuring method is possible when a flash light emission device is mounted on the camera.

In FIG. 9, operational amplifier A1, photo diode PD1, logarithmic conversion diode D1 etc. constitute a light measuring amplifier circuit used for the automatic exposure control by a known exposure control mechanism in the camera such as shutter time control, diaphragm control etc. The light measuring amplifier circuit measures the illuminance of the object existing immediately before exposure.

Similarly to the above embodiments, resistors R1, R2, R7, R8, condenser C6, transistor Q3 and diodes D3, D4 constitute a latch cancelling circuit for the operational amplifier A1. Designated by 10 is a known exposure control circuit for automatically setting proper exposure value. The exposure control circuit performs various known functions for automatic exposure control including Apex arithmetic operation, display control of set exposure value, control of solenoid release etc. The output of the operational amplifier A1 obtained by TTL photometering is introduced into the exposure control circuit 10. The reference voltage source Eo determines the output of the operational amplifier A2. The source voltage of Eo is also introduced into the exposure control circuit 10 for its Apex arithmetic operation.

4 is a flash light emission device electrically connected to the camera through electric contacts P1–P4 of a known accessary shoe. When the power source switch (not shown) of the flash light emission device 4 is closed, a charge current is applied to a flash light discharging condenser for flash light emission. On the completion of charging of the condenser, an amount of current is transmitted to the camera through the contact P4 to light up LED provided on the camera. For example, such LED is provided within the viewfinder of the camera so as to let the user know the state of charging to the flash light emission device by means of ON-OFF of the LED. The anode of LED is connected also to the exposure control circuit 10 so that when the flash light emission device 4 gets in the state completely charged and LED lights up, the control circuit 10 can detect it. When the exposure control circuit 10 detects it, the control circuit, when the camera's shutter is released, automatically controls the shutter speed to such speed at which flash light photographing is possible. At the same time, the control circuit 10 inhibits the automatic exposure control by the shutter/diaphragm control mechanism on the camera's side. Mg1, Mg3 and Mg4 are magnets of which Mg1 is that for electromagnetic releasing, Mg3 is for diaphragm control and Mg4 is for shutter control. The manner of operation of these magnets are well known to those skilled in the art and therefore need not be further described.

SW4 is a memory switch. After ON-signal of camera's release switch SW2 has been transmitted to the exposure control circuit 10 and the current supply to the electromagnetic releasing magnet coil Mg1 has been continued for a determined time, a mechanical sequence of operation of the camera for exposure is started. During the sequence of exposure operation, the memory switch SW4 is closed prior to the start of stop-down of the lens aperture by the diaphragm control mechanism. The switch SW4 remains closed at least until the operation for exposure control is completed, that is, until the shutter is closed. When the memory switch SW4 is closed, the measured value of light by the output of A1 immediately before the aperture stop-down is electrically memorized. In other words, the memory switch SW4 determines the timing for memorizing the measured value of light immediately before the aperture stop-down. The switch SW4 may be interlocked with the shutter to open the switch in response to the closing motion of the shutter at the completion of exposure. Otherwise, the switch may be opened in response to the film advancing operation after exposure. The thing necessary is that the switch SW4 is in its opened position after completing the shutter charge and film advancing operation for the next frame.

SW3 is a trigger switch which is closed in response to the shutter opening motion. The function of this switch SW3 is to transmit to the control circuit 10 the timing for the start of counting time necessary for shutter control. The switch SW3 is opened interlocking with the closing motion of the shutter.

Operational amplifier A204, logarithmic conversion diode D11 and photo diode PD2 constitute a metering circuit for TTL flash output control to control the light emission from the flash light emission device. The photo diode PD2 is disposed in the position to respond to the illuminance on the film plane, at least, the illuminance after the stop-down of the lens aperture. An operational amplifier A205, like the above amplifier A2, gives the operational amplifier A204 a reference bias by a in-phase amplifier circuit responding to the reference voltage source Eo.

Transistor Q204, diodes D205–D210, resistors R206–R208 and condenser C203 constitute a latch cancelling circuit of the operational amplifier A204. Transistor Q205 is a logarithmic expansion transistor. From the control circuit 10 a voltage corresponding to the light sensitivity of film is applied to the emitter of the transistor Q205. Applied to the base of Q205 is the logarithmically compressed voltage of A204. In accordance with these applied voltages, the transistor Q205 puts out from its collector a logarithmically expanded current proportional to the photo current of PD2. The expanded current of Q205 is integrated by a condenser C204.

The integrated voltage by C204 and the reference voltage E1 are compared each other by the operational amplifier A203. When the integrated voltage by C204 reaches the level of the reference voltage E1, the output of the operational amplifier A203 is inverted. The inverted output is transmitted to the flash light emission device 4 through the contact P2 of the accessary shoe 5 to terminate the emission of flash light. The timing for the start of integration by the condenser C204 is given by transistor Q206. In this embodiment, a certain delay time determined by resistor R210, condenser C205 and operational amplifier A206 after turn-ON of trigger switch SW3, the transistor Q206 is rendered conductive to start the integration by the condenser C204. The delay time is selected in such manner that the start of integration by C204 is delayed by the time of from the closing of SW3 to the closing of SW5. The switch SW3 is closed at the start of shutter opening at which time point the emission of flash light is not yet started. When the shutter is fully opened the switch SW5 is closed, which is transmitted to the flash light emission device 4 to start the emission of flash light.

For flash light photographing, the above embodiment operates in the following manner:

On the conduction of transistor Q1 the circuit is powered. In this state, when the power source switch of the flash light emission device 4 is closed, the charging of the flash light discharging condenser is started. Upon the completion of the charging, LED lights up in the manner described above and the control circuit 10 detects it. Thereby the control mode of shutter and diaphragm of the camera is automatically changed over to the mode for flash light photographing. At the same time, the transistor Q209 is rendered non-conductive to allow the opening/closing signal of the memory switch SW4 to be transmitted. By closing the release switch SW2 the current is supplied to the releasing magnet Mg1 to start the mechanical exposure control sequence of the camera. Prior to the start of stop-down of the lens aperture, the memory switch SW4 is closed. Simultaneously with the closing of SW4, the transistor Q204 is rendered conductive. As seen in FIG. 9, the transistor Q209 is interposed in the line extending from the memory switch SW4 to the base of the transistor Q204. For flash light photographing mode only, the transistor Q209 is rendered non-conductive by an output from the control circuit 10. For all other modes, the switch is conductive not to transmit the signal of SW4. The charged voltage on the condenser C203 is so determined that before the conduction of Q204, the charged voltage is positive on the side connected to R206 and negative on the side connected to R207. In other words, the charged voltage is so selected that the voltage generated in the serially connected diodes D205–D208 is higher than the output voltage of the operational amplifier A205. The diodes D205–D208 are not always necessary. However, the provision of these diodes has an effect to keep the charged voltage on the condenser C203 constant irrespective of possible voltage change of the power source $E_B$. Therefore, the latch cancelling operation later described is stabilized well and a better result can be obtained by it.

On the conduction of Q204, the potential at the terminal of the condenser C203 on the side connected to R206 is clamped to the potential on the negative supply line. Consequently, due to its charge voltage, the potential at the connection point of C203 with R207, R208 is further dropped down toward the negative side up to the level lower than the negative line voltage of the power source $E_B$ by the forward voltage of diode D10. Therefore, the diode D209 is forward biased and the current is forcedly flowed into the connection point of the negative input terminal of A204, diode D211 and photo diode PD2 through the diode D211. As a necessary result of it, the positive charge accumulated on the negative input side of A204 by which the latch is caused is surely discharged to the condenser C203 through diode D209 and resistor R207.

As described above, the potential at the connection point of C203, R207 and R208 provisionally becomes a negative potential. However, some time after the condenser C203 is again charged by the current flowing through resistors R207 and R208. But, this time, the condenser is charged in the opposite direction to that of the charge voltage prior to the conduction of Q204. Therefore, finally the voltage becomes equal to the output voltage of A205. At this time, the operational amplifier A204 is normally operating and the difference in voltage between the positive input and the negative input is in the state of imaginary short. There is no current flowing to diode D209 at this time.

The above operation is completed prior to the closing of the emission start switch SW5. In this manner, the latch of the operational amplifier A204 is cancelled immediately before the stop-down of lens aperture and the output of A204 is restored to its normal state.

On the closing of the switch SW5, an emission of flash light is started. The transistor Q206 is rendered non-conductive and the condenser C204 starts the integration of voltage. The integrated voltage on the condenser C204 is compared with the voltage of the reference power source E1. When the former reaches the level of the latter, the output of the operational amplifier A203 is turned to High from Low, which is transmitted to the flash light emission device 4 through the contact P2. The device 4 detects it and stops the emission of flash light. Thus, there is performed an automatic flash output control according to TTL metering. Thereafter, the current supply to the magnet Mg4 is cut off to close the shutter. At the cut-off of the supply current to Mg4, there is generated a kick-back noise when the flash light photographing is carried out in the dark as described above. Such kick-back noise is transmitted to the negative input terminal of the operational amplifier A204 and the latter is latched by it. In the dark there is no photo current of the photo diode PD2 available for cancelling the latch. Therefore, the latch cancellation by photo current can not be expected in this case. However, in this embodiment of the invention, the cancellation of latch of A204 has previously been completed before the emission of flash light. As described above, the latch cancellation has been effected by transistor Q204, diodes D205-D210, resistors R206-R208 and condenser C203 at the shutter release of the camera. Therefore, according to the invention, always stable TTL flash output control can be attained.

The function of diode D210 is, like diodes D205-D208, to further improve the stability of latch cancellation against the voltage variation of the power source $E_B$. The resistor R207 is not always necessary.

Figure 10:
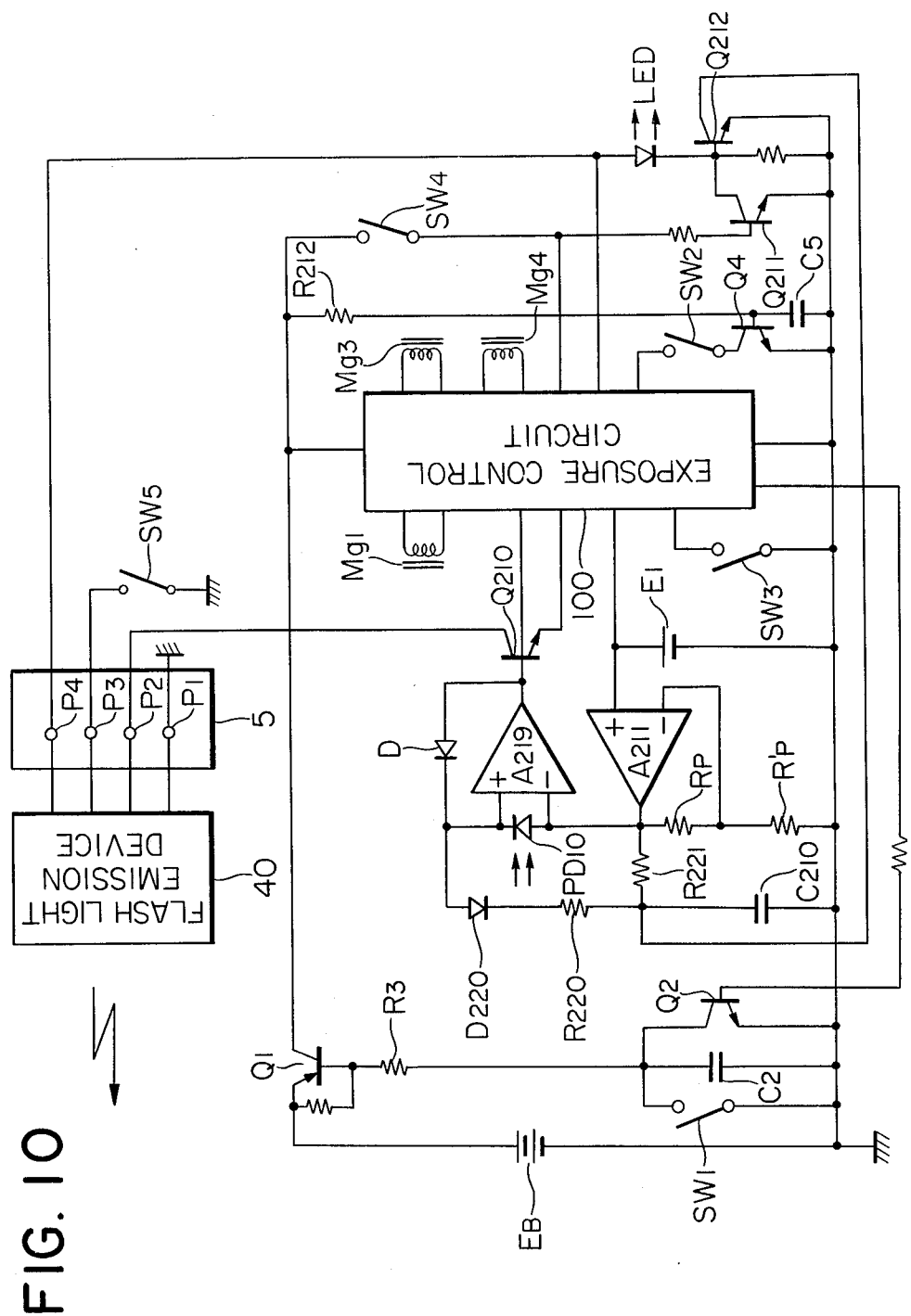
FIG. 10 is a circuit diagram showing a tenth embodiment.

FIG. 10 shows a tenth embodiment of the invention.

This tenth embodiment is different from the above ninth embodiment in the point that the metering circuit for automatic exposure control by controlling the camera's shutter and diaphragm and metering circuit for TTL flash output control use a common light measuring circuit. The integration circuit for TTL flash output control is provided on the flash light emission device. In FIG. 10, like reference characters to FIG. 9 represent the same and functionally corresponding elements.

The photo diode PD10 is disposed in the position to put out a photo current directly corresponding to the quantity of light passed through the lens diaphragm before releasing the shutter and to put out a photo current corresponding the quantity of light reflected upon the film plane after releasing the shutter. The quantity of the reflected light corresponds to the illuminance on the film plane at that time.

Similarly to the ninth embodiment, operational amplifier A210 and logarithmic compression diode D221 constitute a metering circuit which produces out a voltage corresonding to the value of generated photo current and arithmetically compressed. Like A2, A205 in the above embodiment, the operational amplifier A211 in this embodiment produces an output voltage corresponding to the voltage of the reference voltage source Eo as a reference bias to the operational amplifier A210. To perform the latch cancellation as will be described later, the output of A211 is higher than the forward voltage of diode D220.

Before the power source switch of the flash light emission device 40 is closed, there is no current flowing into the camera from the flash device 40 through the contact P4. In this position, therefore, the transistor Q212 is non-conductive. The exposure control circuit 100 is in the position for automatic exposure control because there is generated no voltage on the anode side of LED.

The power supply to the circuit is started when the transistor Q1 is rendered conductive by closing the switch SW1. For a time long immediately after the start of power supply to the circuit, the voltage on the condenser C210 remains zero and the output voltage of A211 continues to have the above relation. Therefore, the diode D220 is forward biased to cancel the latch caused by the unstable state of A210 at the beginning of the power supply. Thereafter, the release magnet Mg1 in the control circuit 100 starts operating provided that the transistor Q4 has previously been rendered conductive by closing the release switch SW3. At the same timing as that in the above embodiment, the memory switch SW4 is closed to memorize the output of the operational amplifier A210. Then an automatic exposure is carried out when the trigger switch SW2 is closed.

When the power source switch of the flash light emission device 40 is closed, at first a small current flows into LED through the contact P4 and the transistor Q212 is rendered conductive. However, the current flowing into LED at the time is too weak to light it up to the extent visually observable. The voltage generated at the anode of LED is detected by the exposure control circuit 100. Therefore, in the manner as previously described, the mode of operation is changed over to the mode for flash light photographing. Upon the completion of charging the flash light discharging condenser in the flash device 40, a sufficiently large current enough to clearly lighten LED flows into LED from the flash device 40 through the contact P4. Thus, the LED in the camera lights up brightly, which is visible by the user of the camera. However, there occurs no change in the state of the transistor Q212 and in the mode of the control circuit 100 by this large current. Since Q212 is conductive, the condenser C210 is being discharged and therefore the diode D220 is forward biased. There is produced a flow of current through diode D220 and therefore also through D221. The operational amplifier A210 produces a voltage logarithmically compressed by the current flowing through the diode D220. A voltage corresponding to the sensitivity of film is being applied to the emitter of transistor Q210 from the control circuit 100. Based on the emitter voltage and the above output of the operational amplifier A210 determined by the current flowing through D220 there is produced at the collector of Q210 an expanded current which flows into the flash device 40 through the contact P2. However, the operation for integrating the current transmitted through P2 is not carried out before starting the flash light emission by closing the switch SW5.

When the camera's releasing mechanism is brought into operation by closing the switch SW2, at first the switch SW4 is closed in the same manner as in the above embodiment. Therefore, the transistor Q211 is rendered conductive and Q212 is rendered non-conductive. Since the transistor Q212 is non-conductive, the condenser C210 is charged through R220 and R221 up to the same voltage level as the operational amplifier A211. At this time, the operational amplifier A210 is in the state of normal output and waiting. The output depends on the photo current of photo diode PD10. There is no latch operation as caused by the accumulation of positive charge on the cathode side of PD10. Thereafter, in response to the opening motion of the shutter, the switch SW3 is closed to start counting the shutter time. When the shutter is fully opened, the switch SW5 is closed to start the emission of flash light. At the same time, on the side of the flash device, the integration of the collector current of Q210 starts. When the integrated current reaches a determined value, the emission of flash light from the flash device 40 is automatically terminated and TTL flash output control is carried out.

After the termination of flash light emission by the flash output control operation, the shutter is closed and switch SW5 is opened. Also, the switch SW4 is opened. In this manner, the latch cancelling operation is carried out always immediately before shooting. Therefore, even when the light measuring operation is performed in the dark for TTL flash output control, always stable TTL flash output control operation is assured.

Figure 11:
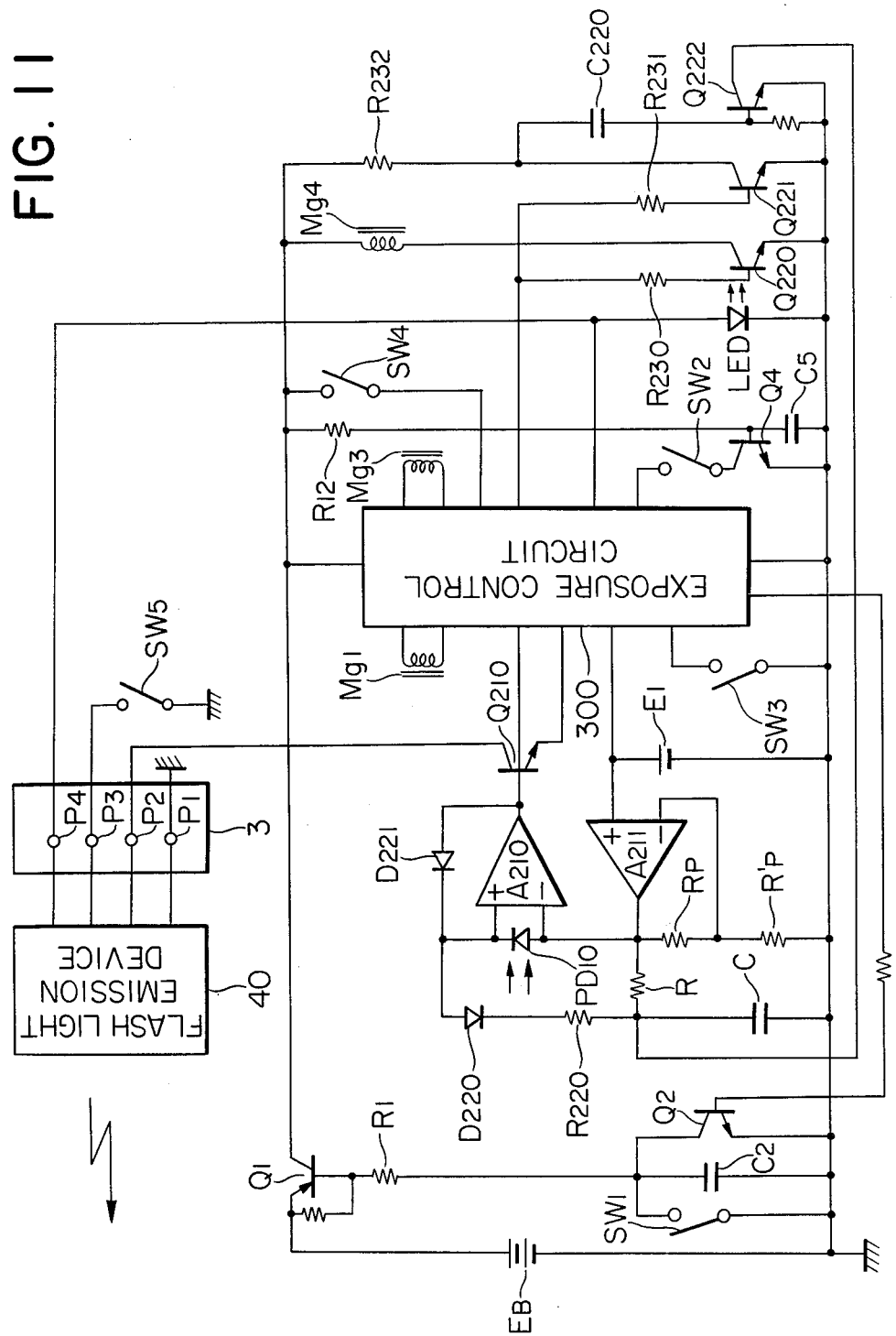
FIG. 11 is a circuit diagram showing an eleventh embodiment.

FIG. 11 shows an eleventh embodiment of the invention.

In the above tenth embodiment, the latch cancellation of the light measuring amplifier has been carried out only for the operation of TTL flash output control and the timing of the latch cancellation has been selected to be a time point immediately before the start of flash light emission. In contrast, in this eleventh embodiment, the latch cancellation is carried out not only for TTL flash output control mode but also for ordinary photographing mode of the camera. The timing of the latch cancellation is selected to be a time point immediately after the completion of every photographing operation.

In FIG. 11, like reference characters to FIG. 10 represent the same or corresponding elements. The manner of operation of the eleventh embodiment is as follows:

300 is an exposure control circuit adapted to control the shutter of the camera. Mg4 is a magnet for shutter control. By closing the switch SW4 the transistor Q220 is rendered conductive through resistor R230. When the switch SW3 is closed, a timer in the control circuit 300 starts counting the shutter time. At the end of the count, the transistor Q220 is rendered non-conductive to initiate the closing motion of the shutter. The transistor Q220 remains non-conductive during the operations of film advancing and shutter charging subsequent to the exposure. It is rendered again conductive when the above described operation is repeated by releasing the camera again.

Transistor Q221 is controlled through resistor R231 in synchronism with the transistor Q220. When the power supply to the circuit is started by closing the switch SW1 to render the transistor Q1 conductive, the charged voltage on the condensers C210 and C220 is zero, and the transistor Q221 is non-conductive. Therefore, transistor Q222 is rendered conductive by the charge current to C220 flowing through R232. Like that in the tenth embodiment, the output voltage of operational amplifier A211 is so preset to the higher than the forward voltage of diode D220. Consequently, the diode D220 is forward biased. On the completion of charging the condenser C220 through R232 (the charge time may be in the range of several 100 $\mu$sec. to several m sec.), the transistor Q222 is rendered non-conductive and the charging of the condenser C210 is started. The condenser C210 is charged with the current flowing through D220 and the current flowing through R221 up to the level equal to the operational amplifier A211 (the charging time of C210 may be in the range of several m sec. to several 10 m sec.). By the above operation the latch caused by unstable state in operation of the operational amplifier A210 at the beginning of power supply is completely cancelled. When the release switch SW2 is closed, the camera's shutter is released in the same manner as above.

After the closing of SW2 and before the closing of trigger switch SW3, the transistor Q220 is rendered conductive by the control circuit 300 to apply current to the shutter control magnet coil Mg4. At the same time, transistor Q221 is also rendered conductive to discharge the condenser C220. The timing for rendering Q220 and Q221 conductive may be at the same time as the closing of memory switch SW4. With the start of shutter opening motion, the trigger switch SW3 is closed to start counting the shutter time. At the completion of counting the shutter time, transistors Q220 and Q221 are rendered conductive to cut off the power supply to the magnet Mg4. Simultaneously with the cut-off of the power supply to Mg4, charging of condenser C220 through R232 is started. When the charging of C220 is completed, the transistor Q222 is rendered conductive and continues to be conductive for a certain determined time long as previously described. By this conduction of Q222 for a determined time, the condenser C210 is discharged. As a result of it, the diode D220 is forward biased and the latch cancelling operation is performed in the same manner as above. In a certain determined time after rendering the transistor Q222 non-conductive, the voltage of condenser C210 reaches the same level as the output voltage of the operational amplifier A211. At this time point, the latch cancelling operation comes to end.

In this embodiment, the above latch cancelling operation is executed not only for TTL flash output control mode but also for automatic exposure control mode without any distinction therebetween. Herein, the term "automatic exposure control mode" means the mode where the camera's shutter and/or diaphragm are automatically controlled to obtain the optimum exposure value.

The latching of the light measuring amplifier occurs at the beginning period of power supply to the circuit and at the time of the power supply to the shutter magnet coil being instantly cut off. In the latter case, the latching is mainly caused by the kick-back noise due to the inverse induced voltage generated when the power supply is abruptly cut off. There is generated no kick-back noise when the current is applied to the coils of magnets Mg1, Mg3, Mg4. Since the magnets Mg1 and Mg3 are not required to respond at a high speed, they may be of the type which does the work when the current is being applied to its coil. However, the magnet Mg4 is used to control a high speed shutter. Therefore, it is preferred that Mg4 be such type of magnet which does the work when the application of current to it is cut off as in the case of FIG. 11. According to the eleventh embodiment, the latch cancellation is surely executed every time of the power supply to the magnet.

In the above eleventh embodiment, the cut-off of Mg4 and the latch cancellation have been carried out at the same time. However, it is to be understood that it is not always necessary to carry out the two operations at the same time. The latch cancellation may be carried out at any time point between the closing of the shutter and the time until which the operational amplifier A210 is required to have been restored to its normal output state for the next shutter releasing. For example, the same effect as above may be attained when the latch cancellation is carried out at a time some time later than the closing of the shutter or at the completion of one frame film advancing after exposure.

In the ninth and tenth embodiments, the latch cancellation has been carried out at the same time as the closing of memory switch SW4. However, it is not always necessary to carry out the latch cancellation simultaneously with the closing of SW4. The latch cancellation may be carried out simultaneously with the closing of release switch SW2'. In case of the ninth and tenth embodiments, the thing necessary is that the latch cancellation should be started and completed between the releasing of the camera's shutter and the time point until which the light measuring amplifier is required to have been restored to its normal output state, namely, before the start of flash light emission.

While the invention has been particularly shown and described with reference to preferred embodiments thereof, it will be understood by those skilled in that art that various changes and modifications may be made therein without departing from the spirit and scope of the invention.

I claim:

1. In a light measuring apparatus for a camera including a power switch, an operational amplifier, a photo diode connected between inversion and non-inversion input terminals of said operational amplifier to afford a state of an imaginary short, and a logarithmic conversion diode to which is applied, as an input, photo current generated in said photo diode, said measuring apparatus being driven in response to supplying electric power from a power source by operation of said power switch, the improvement comprising:
    (a) a unidirectional semiconductor element having two terminals and which enables electric current to flow in one direction only between said two terminals, one of said two terminals of said semiconductor element being connected to a connection point of said logarithmic conversion diode and one of said input terminals of said operational amplifier;
    (b) means for biasing the other terminal of said semiconductor element; and
    (c) response means for causing said biasing means to start biasing in order to flow a current into said semiconductor element in response to said operation of said power switch.

2. In a light measuring apparatus for a camera including an operational amplifier, a photo diode connected between inversion and non-inversion input terminals of said operational amplifier to afford a state of an imaginary short, and a logarithmic conversion diode to which is applied, as an input, photo current generated in said photo diode, said measuring apparatus being driven in response to supplying electric power from a power source, the improvement comprising:
    a unidirectional semiconductor element having two terminals and which enables electric current to flow in one direction only between said two terminals, one of said two terminals of said semiconductor element being connected to a connection point of said logarithmic conversion diode and one of said input terminals of said operational amplifier; and
    biasing means for biasing the other terminal of said semiconductor element, said biasing means forcedly flowing a current into said semiconductor element in response to supplying said electric power for a predetermined period of time and including potential setting means for setting the potential at the other terminal of said semiconductor element such that the electric current flowing through said semiconductor element in response to supplying the electric power decreases with time for the predetermined period of time and becomes substantially zero after the expiration of said predetermined period of time.

3. A light measuring apparatus according to claim 2, wherein said potential setting means includes:
    reference potential means for raising the potential at the other input terminal of said operational amplifier by a determined level relative to a lower one of two potentials set by the power source supplying said electric power; and
    capacitor means connected between said power source and said semiconductor element so as to be charged through said semiconductor element upon supplying said electric power.

4. A light measuring apparatus according to claim 2, wherein said potential setting means includes:
    capacitor means adapted to be charged by said power source prior to supplying said electric power; and
    means for discharging the charged capacitor means thereby flowing the current to said semiconductor element in response to supplying the electric power.

5. A light measuring apparatus according to claim 2, wherein said potential setting means includes capacitor means serially connected to said power source and adapted to be charged for a predetermined delay time from said power supply, said capacitor means being formed to start discharging in response to the end of said delay time thereby flowing the current to said semiconductor element for said predetermined period of time, and to stop said biasing means after the expiration of the predetermined period of time.

6. A light measuring apparatus according to claim 2, wherein said potential setting means includes means for rendering the potential at the other terminal of said semiconductor element substantially equal to the potential at the other input terminal of said operational amplifier at the end of the operation of said biasing means.

7. A camera capable of measuring light from a predetermined number of areas of an object, said camera comprising:
    a predetermined number of light measuring apparatus equal to the predetermined number of areas and adapted to be driven in response to supplying electric power, each of said light measuring apparatus comprising an operational amplifier, a photo diode connected between inversion and non-inversion input terminals of said operational amplifier to afford a state of an imaginary short, and a logarithmic conversion diode connected to one of the terminals of said operational amplifier so as to receive, as an input, photo current generated in said photo diode;
    a predetermined number of semiconductor elements equal to the predetermined number of areas, each semiconductor element being associated with one of said light measuring apparatus and having first and second terminals and being capable of flowing electric current in one direction only between said two terminals, the first one of said two terminals being connected to a connection point of an associated photo diode and one of the input terminals of an associated operational amplifier in each of the light measuring apparatus, and the second terminals of said semiconductor elements being connected to each other; and
    biasing means connected to the second terminals of said semiconductor elements to bias said second terminals individually, said biasing means flowing a current into the respective semiconductor elements in response to the start of supplying the electric power for a predetermined period of time.

8. A camera according to claim 7, wherein said biasing means includes:
capacitor means precharged prior to supplying the electric power; and
means for discharging said precharged capacitor means in response to the start of said power supplying, thereby flowing electric current into said semiconductor elements.

9. A camera according to claim 7, wherein said biasing means includes:
capacitor means and
charging means for charging said capacitor means through said predetermined number of semiconductor elements in response to supplying the electric power.

10. A camera capable of measuring light from a predetermined number of areas of an object, said camera comprising:
a predetermined number of light measuring apparatus equal to the predetermined number of areas and adapted to be driven in response to supplying electric power, each of said light measuring apparatus comprising an operational amplifier, a photo diode connected between inversion and non-inversion terminals of said operational amplifier to afford a state of an imaginary short, and a logarithmic conversion diode connected to one of the terminals of said operational amplifier so as to receive, as an input, photo current generated in said photo diode;
current mirror means having a current input terminal and adapted to produce an output electric current corresponding to a value of current applied to said current input terminal, said output electric current being applied to a connection point of said photo diode and one of the terminals of said operational amplifier in each of said light measuring apparatus; and
input means for applying the current to said current input terminal in response to supplying the electric power for a predetermined period of time.

11. A camera according to claim 10, wherein said input means includes capacitor means, and means for charging said capacitor means in response to supplying the electric power and for applying the current flowing into said capacitor means to said current input terminal.

12. A camera according to claim 11, wherein said input means further includes means for blocking the current flowing into said current input terminal after the lapse of a predetermined time from the start of the power supplying.

13. A camera comprising:
means for carrying out a film exposure operation;
a light measuring apparatus comprising an operational amplifier, a photo diode connected between inversion and non-inversion terminals of said operational amplifier to afford a state of an imaginary short, and a logarithmic conversion diode connected to one of the terminals of said operational amplifier so as to receive, as an input, photo current generated in said photo diode, said light measuring apparatus being driven in response to supplying electric power;
a semiconductor element having two terminals and which enables electric current to flow in one direction only between said two terminals, one of said two terminals of said semiconductor element being connected to a connection point of said logarithmic conversion diode and one of the input terminals of said operational amplifier;
means for biasing the other terminal of said semiconductor element, thereby flowing a current into said semiconductor element, in response to supplying said electric power; and
means for generating a driving signal for driving said biasing means during a time from the completion of a film exposure operation to the start of a next film exposure operation, said biasing means flowing the current to said semiconductor element for a predetermined period of time in response to said driving signal.

14. A camera according to claim 13, wherein said biasing means includes timer means for allowing the biasing operation for the predetermined period of time in response to supplying the electric power.

15. A camera according to claim 13, wherein said biasing means includes potential setting means for continuously changing a potential at the other terminal of said semiconductor element with time in response to said driving signal.

16. A camera according to claim 15, wherein said potential setting means includes means for rendering the potential at the other terminal of said semiconductor element substantially equal to the potential at the other input terminal of said operational amplifier upon completion of operation of said biasing means.

17. A camera according to claim 13 which further comprises means for emitting flashlight toward the object in synchronism with the exposure operation, and wherein said driving signal generating means can generate the driving signal only when said flashlight emission means is in a state ready for flashlight emission.

18. A camera according to claim 13, wherein said exposure operation means includes an electromagnet for controlling the film exposure time, and said driving signal generating means generates the driving signal simultaneously with disruption of current supply to said electromagnet.

19. A camera according to claim 13, wherein said driving signal generating means generates the driving signal in response to the completion of shutter charging.

20. A camera according to claim 13, wherein said driving signal generating means generates the driving signal in response to the completion of film advancement.

21. A camera comprising:
means for carrying out a film exposure operation;
means for emitting flashlight toward an object in response to the exposure operation;
a light measuring apparatus comprising an operational amplifier, a photo diode connected between inversion and non-inversion terminals of said operational amplifier to afford a state of an imaginary short, and a logarithmic conversion diode connected to one of the terminals of said operational amplifier so as to receive, as an input, photo current generated in said photo diode, said light measuring apparatus being driven in response to supplying electric power;
a semiconductor element having two terminals and which enables electric current to flow in one direction only between said two terminals, one of said two terminals of said semiconductor element being connected to a connection point of said logarithmic conversion diode and one of the terminals of said operational amplifier;

means for baising the other terminal of said semiconductor element to flow a current into said semiconductor element; and means for enabling said biasing means to start biasing said semiconductor element during a time from the completion of an exposure operation to the start of a synchronous flashlight emission upon a next exposure operation, said enabling means generating a driving signal in response to which said biasing means flows current into said semiconductor element for a predetermined period of time.

* * * * *